United States Patent [19]

Hoyle, Jr.

[11] 4,361,196
[45] Nov. 30, 1982

[54] ROOF BIT COUPLING

[75] Inventor: Gettys D. Hoyle, Jr., Matthews, N.C.

[73] Assignee: Carmet Company, Pittsburgh, Pa.

[21] Appl. No.: 167,625

[22] Filed: Jul. 11, 1980

[51] Int. Cl.³ .......................................... E21B 17/00
[52] U.S. Cl. ................................. 175/320; 285/176;
 285/401; 403/348; 403/350; 403/383
[58] Field of Search .............. 285/176, 175, 328, 401;
 175/320; 403/348, 350, 383

[56] References Cited

U.S. PATENT DOCUMENTS

| | | | |
|---|---|---|---|
| 2,122,244 | 6/1938 | Brown | 403/350 X |
| 3,104,532 | 9/1963 | Severinsson | 285/401 X |
| 3,304,816 | 2/1967 | Galorneau | 175/320 X |
| 4,009,760 | 3/1977 | Hansen et al. | 175/320 |
| 4,086,972 | 5/1978 | Hansen et al. | 175/320 X |
| 4,099,585 | 7/1978 | Emmerich | 175/320 |
| 4,226,290 | 10/1980 | McSweeney | 175/320 |

FOREIGN PATENT DOCUMENTS 558868  1/1944  United Kingdom ............... 403/350
659798  4/1979  U.S.S.R. ............................... 403/350

Primary Examiner—Thomas F. Callaghan
Attorney, Agent, or Firm—John K. Williamson; John L. LaPierre

[57] ABSTRACT

A quick release, high torque coupling for interconnecting the bit and drive member in a mine roof drill has axial-locking and torque-transmitting structure integral with the drill members. A plug on the drive member is adapted to be releasably received within a mating socket in the bit and has an axial-locking segment on its outermost end complementally configured with respect to an acircular constriction in the socket to permit insertion of the axial-locking segment into the socket beyond the constriction. A torque transmitting segment on the plug cooperates with the constriction to limit relative rotation of the bit and drive member between oppositely directed torque-transmitting positions. In one of the torque-transmitting positions, the constriction and axial-locking segment are misaligned such that the plug is restrained against axial retraction from the socket.

7 Claims, 8 Drawing Figures

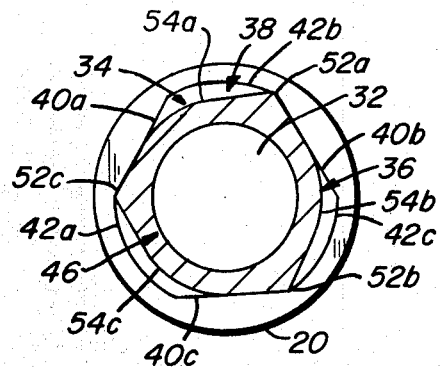
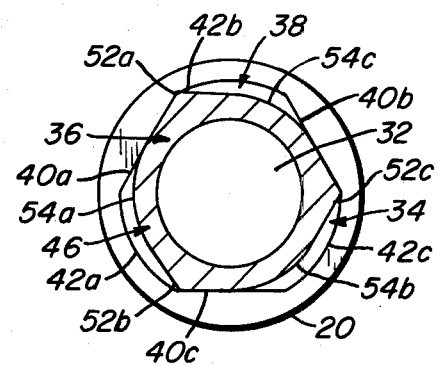
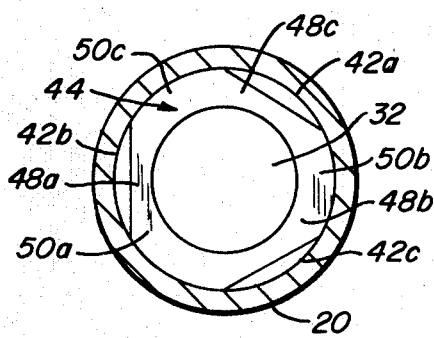
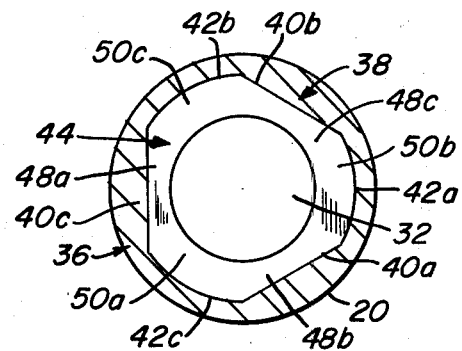
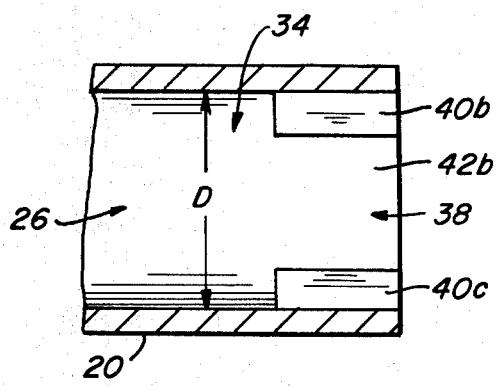
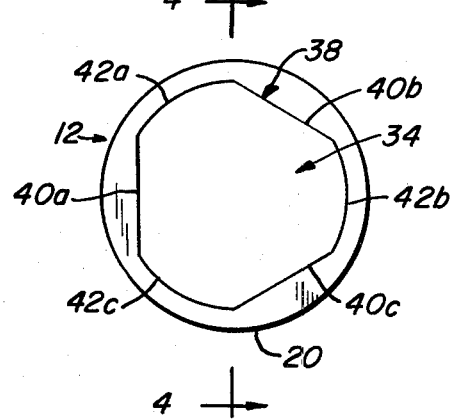

ROOF BIT COUPLING

TECHNICAL FIELD

This invention relates to tools for drilling holes in mine roofs in general, and is particularly concerned with a quick release coupling for attaching the bit to the driving member in a roof drill.

BACKGROUND ART

In the drilling of bolt holes for reinforcing structure in mine roofs, it is often necessary to penetrate to a depth greater than the heighth of the mine chamber below the roof. Various systems have been developed for accomplishing this task, such as that shown in Hansen, et al. U.S. Pat. No. 4,009,760. Typically, such systems comprise a starter-driver rod adapted to be releasably attached to a drill bit, and one or more extension rods adapted to be successively interposed between the bit and the starter-driver rod as the drilling of the hole progresses.

In such systems, as well as in those employing only a driver rod and a drill bit, it is important to be able to quickly and easily remove the bit from the driver rod. At the same time, however, the coupling between the bit and driver rod must be sufficiently strong to transmit the relatively high torque required to drill holes in mine roofs, as well as provide a locking mechanism to preclude removal of the bit from the driving rod during drilling of the hole. Heretofore, couplings between the drill bit and the driver rod have not proved entirely satisfactory in this regard. For example, the coupling shown in the above-cited Hansen patent comprises a female hex socket and mating male hex plug with a removable pin adapted to be received within a transversely extending hole through the socket wall and plug. While this system has proved satisfactory from an operating standpoint, it is not particularly conducive to quick release operation.

Other coupling systems presently offered by manufacturers of drill steel are various modifications of the basic idea of providing a male and female hex with detent structure for interlocking the two. Such systems are relatively expensive to manufacture and many require special tools for releasing the detent.

SUMMARY OF THE INVENTION

The present invention overcomes the problems alluded to above by the provision of a quick release, high torque coupling requiring only free insertion of a plug on the driver member into a socket on the drill bit and a slight twist of the bit in order to place the assembly in an axially-locked, torque-transmitting position. A socket in the drill bit has an acircular constriction at the outermost end thereof. A mating plug on the driver member has an outermost, axial-locking segment of a transverse cross section complemental to the constriction in the bit socket such that the locking segment may pass through and beyond the constriction when the plug is inserted into the socket.

A torque-transmitting segment on the plug inwardly of the axial-locking segment cooperates with the constriction to permit limited rotation of the bit relative to the driver member between left- and right-hand torque-transmitting positions. Thus, when the plug is inserted into the socket with the axial-locking segment disposed beyond the constriction, the bit may be rotated to a torque-transmitting position wherein the axial locking segment is angularly misaligned with the constriction and removal of the plug from the socket is precluded.

BRIEF DESCRIPTION OF THE DRAWINGS

FIG. 3 is an end view of the socket end of the drill bit;

FIG. 4 is a partial, longitudinal cross sectional view of the socket end of the bit;

FIG. 5 is a transverse, full cross sectional view taken along line 5—5 of FIG. 1 and showing the plug in its axially locked position;

FIG. 6 is a transverse, full cross sectional view as in FIG. 5, but showing the plug in its unlocked position;

FIG. 7 is a transverse, full cross sectional view taken along line 7—7 and showing the plug in a first torque-transmitting position; and FIG. 8 is a transverse, full cross sectional view as in FIG. 7, but showing the plug rotated to a second torque-transmitting position.

DETAILED DESCRIPTION OF THE DRAWINGS

Figure 1:
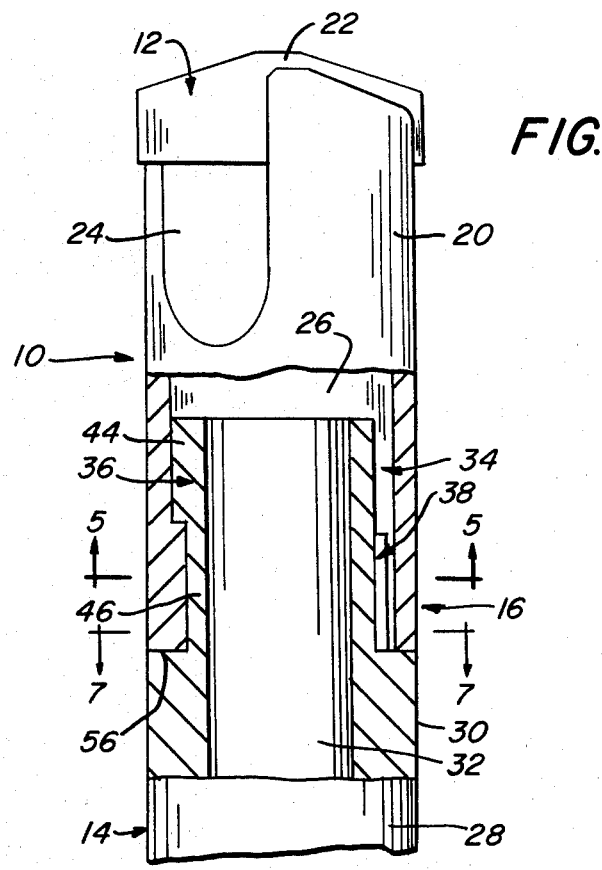
FIG. 1 is an enlarged, partial side elevation view of a drill assembly constructed in accordance with the principles of the present invention, and having portions thereof shown in section to reveal details of construction.

In FIG. 1, there is shown a mine roof drilling assembly 10 comprising a carbide-tipped drill bit 12, an elongate driver member 14, and a quick release, high torque-transmitting coupling 16 releasably attached the bit 12 to the member 14. Though not shown, it is to be understood that a power drive may be operably coupled to the member 14 at the end remote from the bit 12 for powered rotation of the assembly 10 as is well-known in the art. Alternatively, the driver member 14 may be coupled at its remote end with another driver member which in turn is coupled to the power drive. In either case, the coupling 16 transmits the high drilling torques associated with mine roof drilling to the drill bit 12 from the driver member 14.

The bit 12 is of conventional construction having a generally cylindrical body 20 and an apiculate carbide tip 22 supported on the cutting end of the body 20. A pair of longitudinally extending grooves 24 (only one of which is shown) are provided to permit free flow of cutting dust away from the tip 22 during drilling. Further to this end, the bit 12 has a central axial bore 26 in flow communication with the grooves 24 via dust holes (not shown) through the side wall of the body 20. The bore 26 is adapted to be placed in flow communication with a source of negative pressure for removal of the cutting dust.

The driver member 14 is also generally cylindrical, though substantially longer than the bit 12, and comprises a body 28, a bit-receiving end 30 and an opposed power drive end (not shown). An axial bore 32 extend longitudinally of the body 28 from the bit-receiving end 30 to the power drive end, and serves as a conduit between the bore 26 and the negative pressure source.

The coupling 16 comprises a socket 34 formed in the end of bit 12 remote from the tip 22, and a mating plug 36 on the bit-receiving end of the member 14 in axial alignment therewith. When the bit coupling 16 is secured as shown in FIG. 1, the socket 34 and plug 36 cooperate to hold the bit 12 and the driver member 14 in axial alignment, transmit torque therebetween, and preclude inadvertent detatchment of the bit 12 from the member 14.

As shown in FIGS. 1, 3 and 4, the socket 34 is generally cylindrical, but has at its outermost end a constriction 38 of acircular transverse cross section. At its uppermost end, the socket 34 communicates with the axial bore 26 and adds a circular cross section of a diameter D.

Considering now FIG. 3, it may be seen that the acircular cross section of the constriction 38 is defined by three non-adjacent sides 40a, b and c of a reference hexagon, interconnected by three arcs 42a, b and c of the circumscribed circle of the reference hexagon. In the embodiment as shown, the diameter of the circumscribed circle of the reference hexagon is equal to the diameter D of the socket 34.

Figure 2:
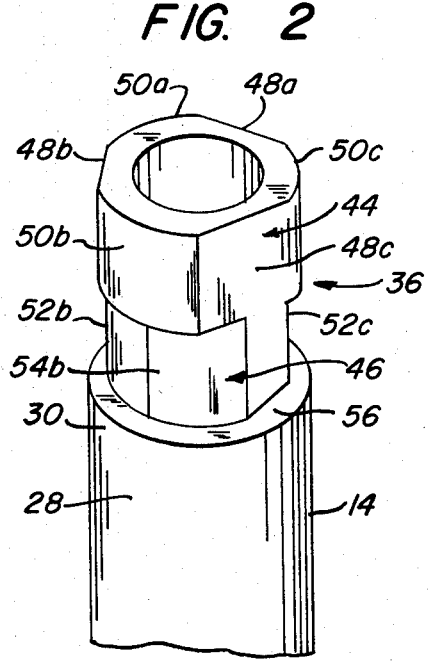
FIG. 2 is a partial perspective view of the plug end of the drive member.

As shown in FIG. 2, the mating plug 36 is axially divided into two sections, an outermost axial-locking segment 44 and an inner torque-transmitting segment 46 intermediate the segment 44 and the bit-receiving end 30. As implied, the segment 44 cooperates with the constriction 38 to limit axial movement of the bit 12 relative to member 14, while the segment 46 cooperates with the constriction 38 to transmit torque between the bit and driver member.

Considering more particularly the FIGS. 2, 5 and 6, it is seen that the axial-locking segment 44 has an acircular transverse section complemental to the transverse cross section of the constriction 38, and accordingly, presents three non-adjacent rectilinear sides 48a, b and c corresponding to sides of the aforementioned referenced hexagon, and three non-adjacent arcuate sides 50a, b and c interconnecting the non-adjacent sides 48. By virtue of its complemental cross section, the segment 46 may pass axially through the constriction 38 when the plug 36 is radially aligned with the bit 12 as shown in FIG. 6. The segment 44 is spaced sufficiently from the end 30 of the member 14 as to extend beyond the constriction 38 when the plug 36 is fully inserted into the socket 34 as shown, for example, in FIG. 1.

It will be appreciated that when the axial-locking segment 44 is angularly misaligned (i.e., angularly misaligned about the longitudinal axis of the assembly 10) with respect to the constriction 38, axial movement between the bit 12 and the member 14 is restricted. Thus, when the plug 36 is fully inserted into the socket 34 and the bit 12 rotated about its longitudinal axis with respect to the member 14, the axial locking segment 44 will be misaligned with respect to the constriction 38, as shown for example in FIG. 5, and removal of the bit 12 from the driver member 14 by only axial movement is precluded.

The torque-transmitting segment 46 is shown in detail in FIGS. 2, 7 and 8. The segment 46 has an acircular transverse cross section dissimilar to the transverse section of the segment 44 and has an axial dimension substantially equal to that of the constriction 38. The transverse cross section of the torque-transmitting segment 46 is defined by the aforementioned reference hexagon and its inscribed circle, where three non-adjacent corners 52a, b and c of the original reference hexagon are retained while the area between other three corners of the referenced hexagon and the inscribed circle is removed to define three arcuate transitions surfaces 54a, b and c interconnecting the non-adjacent corners 52. The relative geometry of the constriction 38 and the torque-transmitting segment 46 permits limited rotation of the bit 12 relative to the driver member 14 between a first torque-transmitting position shown in FIG. 7 wherein the bit 12 may be driven in a clockwise position and a second torque-transmitting position shown in FIG. 8, wherein the bit may be driven in the opposite direction.

The segment 44 is angularly positioned about the longitudinal axis of the member 14 relative to the torque transmitting segment 46 such that when the segment 46 is in its first torque-transmitting position shown in FIG. 7 the axial-locking segment 44 is in its axial-locked position with respect to the constriction 38 as shown in FIG. 5, and when the segment 46 is in its second torque-transmitting position as shown in FIG. 8, the segment 44 is in alignment with the constriction 38 as shown in FIG. 6.

In preferred forms, an annular shoulder 56 may be provided on the bit receiving end 30 of the driven member 14 to form a stop with the socket end of the bit 12 for limiting the penetration of the plug 36 into the socket 34.

INDUSTRIAL APPLICABILITY

As previously explained, the assembly 10 has particular application for drilling holes in mine roofs to permit securement of roof supporting structure. Accordingly, the coupling 16 must be able to withstand the rigors of drilling into hard rock materials in addition to providing the advantages of quick release operation.

When the coupling 16 is connected by passing the axial-locking segment 44 through the constriction 38 and then twisting the bit 12 such that the segments of the plug 36 are disposed with respect to the constriction 38 as shown in FIGS. 5 and 7, the bit 12 is positively secured to the member 14 for high torque rotation. As shown in FIG. 7, the coupling 16 still remains three driving flats of the original reference hexagon such that the superior torque-transmitting capabilities of a hexagonal connection are substantially maintained. At the same time however, the bit 12 is axially locked onto the member 14 to preclude undesired detachment during the drilling operation. An important feature of the present invention is that it offers all of the foregoing advantages without requiring additional locking components. That is to say, the coupling 16 is unitary, having components that are integral with the bit 12 and the member 14. There are no moving parts in the coupling which may be susceptible to wear or clogging from the continuous exposure to abrasive drilling dust.

An additional advantage of the coupling 16 in the assembly 10 is that it may be easily secured and released using only manual manipulation. No special tools or skills are required to attach the bit 12 to the member 14 for the drilling operation. This is particularly important in mining operations where operators are often working in close quarters with limited access to tools.

What I claim is:

1. In a mine roof drilling system of the type having a drive member and a bit member, a high torque coupling for releasably interconnecting said members for rotation about a common axis, said coupling including:

a plug on one of said members projecting axially from an end thereof and having an outermost axial-locking segment and a discrete torque-transmitting segment;

a socket in one end of the other said members adapted to releasably receive said plug with said members axially aligned; and a radial constriction in said socket, said constriction having an acircular transverse cross-section;

said axial-locking segment having a transverse cross-section complemental to said acircular cross-section of the constriction to permit the axial-locking segment to pass through the restriction when the cross-sections are aligned for insertion or withdrawal of the plug from the socket;

said torque-transmitting segment having an acircular transverse cross-section dissimilar to the cross-section of said restriction and cooperable therewith to permit limit relative rotation of said members with respect to one another between right- and left-hand torque-transmitting positions when the plug is received within the socket;

said axial-locking segment being angularly positioned about the axis of said one member relative to said torque-transmitting member such that the locking-segment is angularly misaligned with said restriction when the members are in one of said torque-transmitting positions whereby to preclude withdrawal of the plug from the socket by solely axial movement.

2. The invention of claim 1, and stop means for precluding insertion of the torque-transmitting segment of the plug beyond the restriction in the socket.

3. The invention of claim 1, wherein said axial-locking segment is angularly aligned with said restriction when said members are in the other of said torque-transmitting positions.

4. The invention of claim 1, wherein a single reference regular polygon defines a part of each of said acircular transverse cross-sections.

5. The invention of claim 4, the transverse cross-section of said torque-transmitting segment being formed by removing the area of said reference polygon between its inscribed circle and the periphery of the polygon at selected corners such that there remains only non-adjacent corners of the original polygon.

6. The invention of claim 5, the transverse cross-section of said axial-locking segment being formed by adding to the reference polygon the area between the circumscribed circle of the polygon and its periphery at selected sides of the reference polygon such that there remains only non-adjacent sides of the original polygon.

7. The invention of claim 5, wherein said reference polygon is a hexagon.

* * * * *